Patented Feb. 11, 1941

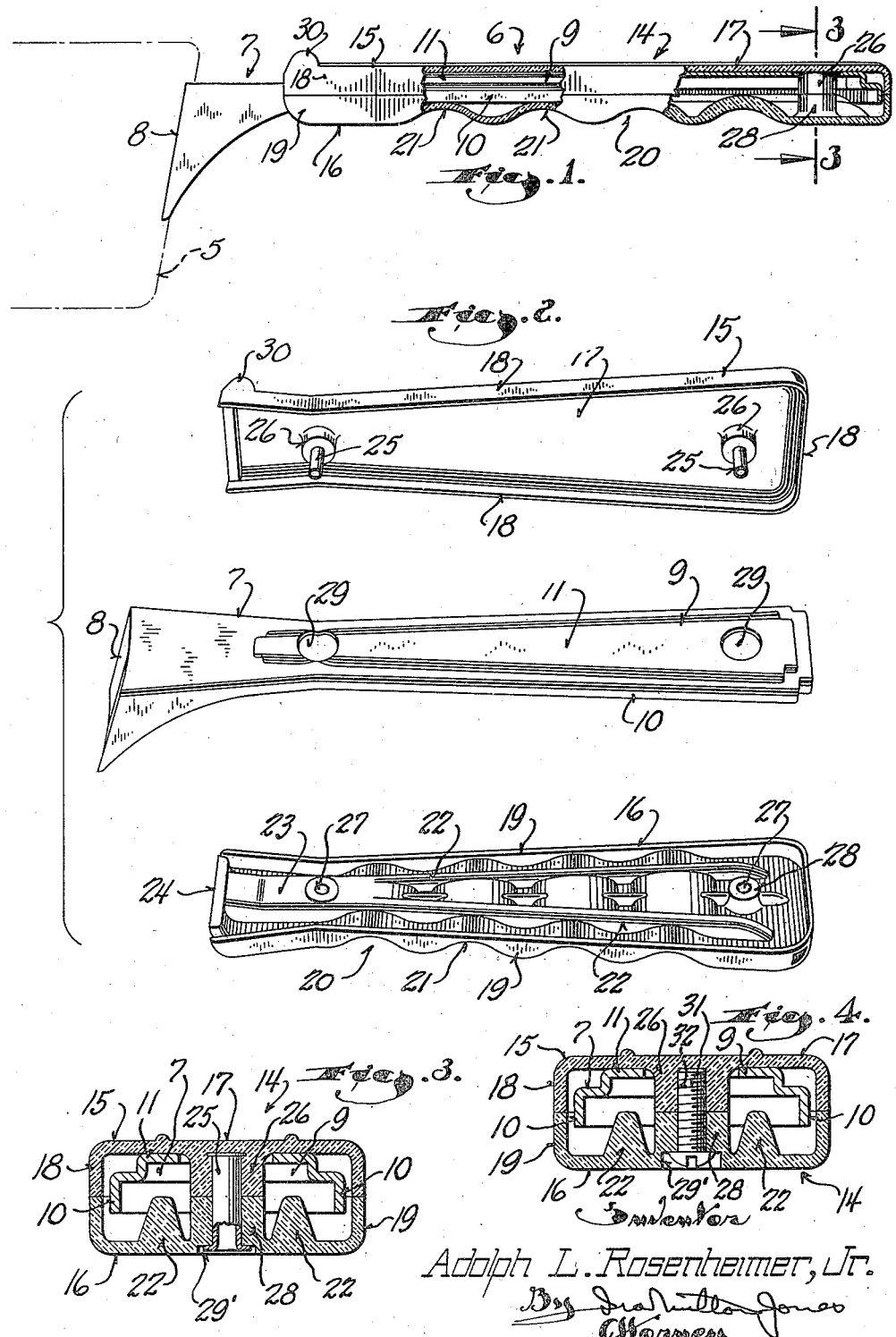

2,231,222

UNITED STATES PATENT OFFICE 2,231,222

HANDLE FOR COOKING UTENSILS

Adolph L. Rosenheimer, Jr., Kewaskum, Wis., assignor to Kewaskum Aluminum Company, Kewaskum, Wis., a corporation of Wisconsin Application June 26, 1939, Serial No. 281,094

3 Claims. (Cl. 16—116)

This invention relates to cooking utensils and refers particularly to handles therefor.

The provision of a suitable heat insulating handle grip for cooking utensils has always been a problem. Grips of wood or other heat insulating material have been used; but the difficulty of attaching them to the utensil has caused most manufacturers to avoid using them, and as a consequence, only a metal handle was provided. This, of course, necessitates that the housewife employ some form of "pot holder" in handling the utensil.

Another very serious disadvantage of handle grips heretofore in use has been the fact that they could not be readily replaced; and as they were often broken or became loose, they were regarded more or less as a constant source of irritation and ill will toward the manufacturer.

This invention, therefore, has, as its primary object, the provision of an insulating handle grip for cooking utensils which is practical in construction and which is securely retained in position though capable of ready replacement.

Another object of this invention is to provide a handle grip of the character described, which is relatively inexpensive and which can be carried in stock independently of the cooking utensils for replacement purposes.

More specifically, it is an object of this invention to provide an insulating grip for handles of cooking utensils which comprises complementary sections adapted to be secured together with the metal handle of the utensil positioned therebetween, and which completely encloses the major portion of the handle so that the handle may be roughly stamped from sheet metal and requires no finishing Still another object of this invention is to provide a sectional grip of the character described, wherein the section forming the lower portion of the handle is provided with an undulatory lower surface which forms transverse finger receiving recesses and which provides spaced contact points along the inside of the section for restricted contact with the adjacent portion of the metal handle.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiment of the invention constructed according to the best modes so far devised for the practical application of the principles thereof, and in which:

Figure 1 is a view partly in side elevation and partly in section, illustrating one complete embodiment of this invention;

Figure 2 is a perspective view illustrating the grip detached from the metal handle of the utensil;

Figure 3 is a transverse sectional view taken through Figure 1 on the plane of the line 3—3; and Figure 4 is a view similar to Figure 3 illustrating a modified form of the invention.

Referring now particularly to the accompanying drawing, in which like numerals indicate like parts, the numeral 5 designates the portion of a cooking utensil to which the handle assembly, indicated generally by the numeral 6, of this invention, is secured. The handle assembly 6 is composed of a handle part 7 formed of any suitable metal but preferably of stainless steel welded or otherwise permanently secured to the utensil 5. This handle part consists of a substantially flat stamping having one end portion 8 bent angularly and shaped to fit the contour of the utensil.

The projecting end portion 9 is channel shaped in cross section with its flanges 10 extending around the outer end of the handle part and with its web formed with a raised central rib portion 11 extending from a point adjacent to the bent portion 8 substantially to its opposite end. This formation gives the stamped handle part exceptional rigidity and allows it to be formed from relatively light stock.

The metal handle part is substantially wholly enclosed in a nonmetallic casing, indicated generally by the numeral 14, to facilitate handling of the utensil. This casing is adapted to completely surround the outer end portion 9 of the metal handle. It is preferably formed of any suitable insulating material, such as a thermoplastic, and consists of complementary upper and lower sections 15 and 16, respectively.

The upper section 15 has a substantially flat top wall 17 and depending flanges 18 along its side edges and across the outer end. These flanges form side and end walls of such height as to partially cover the flanges 10 of the metal handle part 9 when the upper section is superimposed thereon.

The lower section 16 has a similar channel shaped cross section, having flanges 19 along its side edges and across its outer end forming side and end walls which cooperate with the side and end walls of the upper section to wholly enclose the outer end portion 9 of the metal handle.

The bottom wall of the lower section has an undulatory formation 20 to provide a series of transverse depressions 21 for the reception of the fingers when the handle is grasped in the ordinary manner.

For the sake of lightness, the inside wall of the lower section follows the contour of its outer surface so as to provide uniform wall thickness, as clearly illustrated in Figure 1.

The strength of the lower section is increased by ribs 22 extending longitudinally along the inside of the section to join the undulations. At their inner ends, the ribs 22 merge with a pad or boss 23 to which an end wall 24 is joined. The end wall terminates short of the adjacent side walls 19 to provide space for the reception of the flanges on the metal handle part.

When the grip sections are properly positioned on the handle part, the transverse wall of the upper section contacts the raised or ribbed portion 11 of the handle part 9, while only the crests of the undulations on the interior of the lower section contact the edges of the flanges 10.

Thus, it will be seen that irregularities in the roughly stamped handle part 9 will be compensated for and that only a minimum contact exists between the metal handle part and its grip.

As clearly shown in the drawing, the shape of the metal handle part and the complementary grip sections is such that when the sections are in place on the handle part, they are held against relative endwise motion with respect to each other and the handle part, independently of any holding or securing means. This is brought about by the fact that the metal handle part has its flanged side edges tapered from its opposite ends toward a minimum cross section lying medially of the ends of the handle part and near the bent inner end portion, which is secured to the utensil.

The side edges of the grip sections are correspondingly tapered so that when in position on the handle part, longitudinal motion thereof with respect to the handle part is precluded.

When it is desired to permanently secure the grip sections to the metal handle, rivets 25 embedded in pads or bosses 26 carried by the upper section are employed. In the present instance, two such rivets have been provided, one near each end of the grip.

The lower section 16 has holes 27 in alignment with the rivets 25. One hole passes through a pad 28 at the outer end of the section, and the other hole passes through the boss 23 at the inner end of the section.

In assembling the sections on the handle part 9, the upper section 15 is properly positioned thereover, with its rivets and pads projecting through openings 29 in the handle part. The lower section is then properly applied with the ends of the rivets projecting through the holes 27, and secured in place by peening over the ends of the rivets. Preferably, a counterbore 29' is provided in the section 16 so that the heads of the rivets are recessed and are not contacted by the hand of the user during normal use of the utensil.

If desired, the end of the upper section adjacent to the utensil may be provided with a transverse rib or projection 30 which in the normal use of the utensil acts as a stop against which the thumb of the user's hand is engageable to prevent contact with the metal handle.

While the grip may be permanently secured to the handle, it is advantageous to have the grip sections readily detachable to facilitate replacement in the event one or both sections is cracked or broken; and to this end, screws 31 may be provided, as shown in the modified embodiment in Figure 4. The screws are preferably inserted through the lower section and threaded into tapped holes 32 in the pads 26 of the upper section.

Thus, it will be seen that replacement of the grip sections may be readily accomplished in the home without the need for sending the utensil back to the factory for repairs.

Another advantage of having the grip sections replaceable is that the grips may be carried in stock in different colors and independently of the utensils, which enables a purchaser of a set of utensils to equip all of them with grips of any selected color, either at the time of purchase or at any future date.

From the foregoing description taken in connection with the accompanying drawing, it will be readily apparent to those skilled in the art, that this invention affords a simple but efficient heat resistant grip for the metal handle of a cooking utensil which will at all times be maintained firmly in position thereon and which is readily replaceable in the event of breakage.

What I claim as my invention is:

1. A handle for cooking utensils comprising: a metal stamping having one end provided for attachment to a utensil and having tapered side edges provided with marginal flanges; a grip of nonmetallic material enclosing the major portion of the stamping, said grip comprising, complementary upper and lower sections having flanges along their side edges to overlie the flanged side edges of the stamping, the lowermost section engaging the open side of the stamping and having its bottom wall of substantially uniform thickness and formed with a series of undulations providing transverse finger receiving depressions; longitudinal reinforcing ribs extending along the inside of said lower section and joining the undulations, said reinforcing ribs terminating in a central boss at the inner end of the lower section and said inner end of the lower section having a transverse wall merging with said boss and terminating short of the adjacent side flanges to provide openings through which the flanges of the stamping pass; and means for securing the complementary sections together with the stamping therebetween.

2. A handle for a cooking utensil comprising: a sheet metal stamping substantially channel shaped in cross section with its side flanges tapering toward each other in opposite directions from both ends to its minimum cross section which lies medially of the ends of the stamping; two complementary grip forming sections enclosing the major portion of the stamping, both of said sections being of substantially hollow channel-like formation, one of said sections closing the lower open face of the stamping and the other section covering the top of the stamping, the first named section having its transverse wall formed in a series of undulations to provide finger receiving depressions along the bottom of the handle, the crests of said undulations on the inside of the section contacting the edges of the side flanges on the stamping so that said lower section has limited contact with the metal stamping; and means for securing the sections together with the stamping therebetween.

3. A molded heat insulating grip for cooking utensil handles comprising: two complementary similar sections each of which has marginal flanges extending along the sides and one end thereof to give the same a channel-like cross section, the edges of the marginal flanges of the two sections being adapted to abut so that the sections jointly form a hollow handle receiving structure when assembled; the web of one of the sections being undulatory in shape to provide a series of transverse finger receiving grooves extending transversely across said section with the crests of the undulations on the inner side of the section being engageable with one side of a cooking utensil handle to lessen the area of contact between said section and the handle; and means for securing the complementary sections together.

ADOLPH L. ROSENHEIMER, Jr.